(12) United States Patent
Trautmann

(10) Patent No.: US 7,021,183 B2
(45) Date of Patent: Apr. 4, 2006

(54) DRIVE HOUSING FOR MACHINE TOOL DRIVES

(75) Inventor: Guenther Heinrich Trautmann, Kirchheim (DE)

(73) Assignee: Index-Werke GmbH & Co. KG Hahn & Tessky, Esslingen (DE)

( * ) Notice: Subject to any disclaimer, the term of this patent is extended or adjusted under 35 U.S.C. 154(b) by 57 days.

(21) Appl. No.: 10/773,936

(22) Filed: Feb. 6, 2004

(65) Prior Publication Data

US 2004/0154444 A1  Aug. 12, 2004

Related U.S. Application Data

(63) Continuation of application No. PCT/EP02/08902, filed on Aug. 9, 2002.

(30) Foreign Application Priority Data

Aug. 9, 2001  (DE) ................. 101 40 253

(51) Int. Cl.
*B23B 19/02* (2006.01)
(52) U.S. Cl. .......................... 82/142; 82/147
(58) Field of Classification Search .................. 82/142, 82/147, 163, 173; 74/567
See application file for complete search history.

(56) References Cited

U.S. PATENT DOCUMENTS

| | | | |
|---|---|---|---|
| 3,999,445 A | * | 12/1976 | Liautaud ..................... 74/445 |
| 4,422,498 A | | 12/1983 | Chen |
| 4,630,498 A | | 12/1986 | Santi |
| 4,795,012 A | * | 1/1989 | Durum ........................ 464/99 |
| 5,160,824 A | | 11/1992 | Babel |
| 5,657,679 A | | 8/1997 | Hronas et al. |
| 5,668,427 A | * | 9/1997 | Morita ....................... 310/216 |
| 5,730,817 A | | 3/1998 | Feygin et al. |
| 5,836,215 A | | 11/1998 | Beier et al. |
| 5,930,076 A | * | 7/1999 | Morita .................... 360/99.08 |
| 6,145,419 A | * | 11/2000 | Laycock ..................... 82/1.11 |

FOREIGN PATENT DOCUMENTS

| | | |
|---|---|---|
| DE | 30 26 685 | 2/1982 |
| DE | 100 01 523 | 6/2001 |
| DE | 199 58 146 | 6/2001 |
| DE | 100 10 028 | 9/2001 |

* cited by examiner

*Primary Examiner*—Willmon Fridie, Jr.
(74) *Attorney, Agent, or Firm*—Lipsitz & McAllister, LLC

(57) ABSTRACT

In order to provide a drive housing for machine tool drives which offers the possibility, with simple production technology, of not being subject to any restrictions whatsoever with respect to the recess to be provided, it is suggested that this have a plurality of segments which are stacked in a stacking direction, are cut out from flat material and extend in stacking planes transversely to the stacking direction and each of which has continuous material web systems of a constant thickness which extend in such a manner that segments following one another in stacking direction abut on one another with their material web systems, thereby forming overlapping surfaces, and are connected to one another areally and with a material fit in the area of their overlapping surfaces.

41 Claims, 14 Drawing Sheets

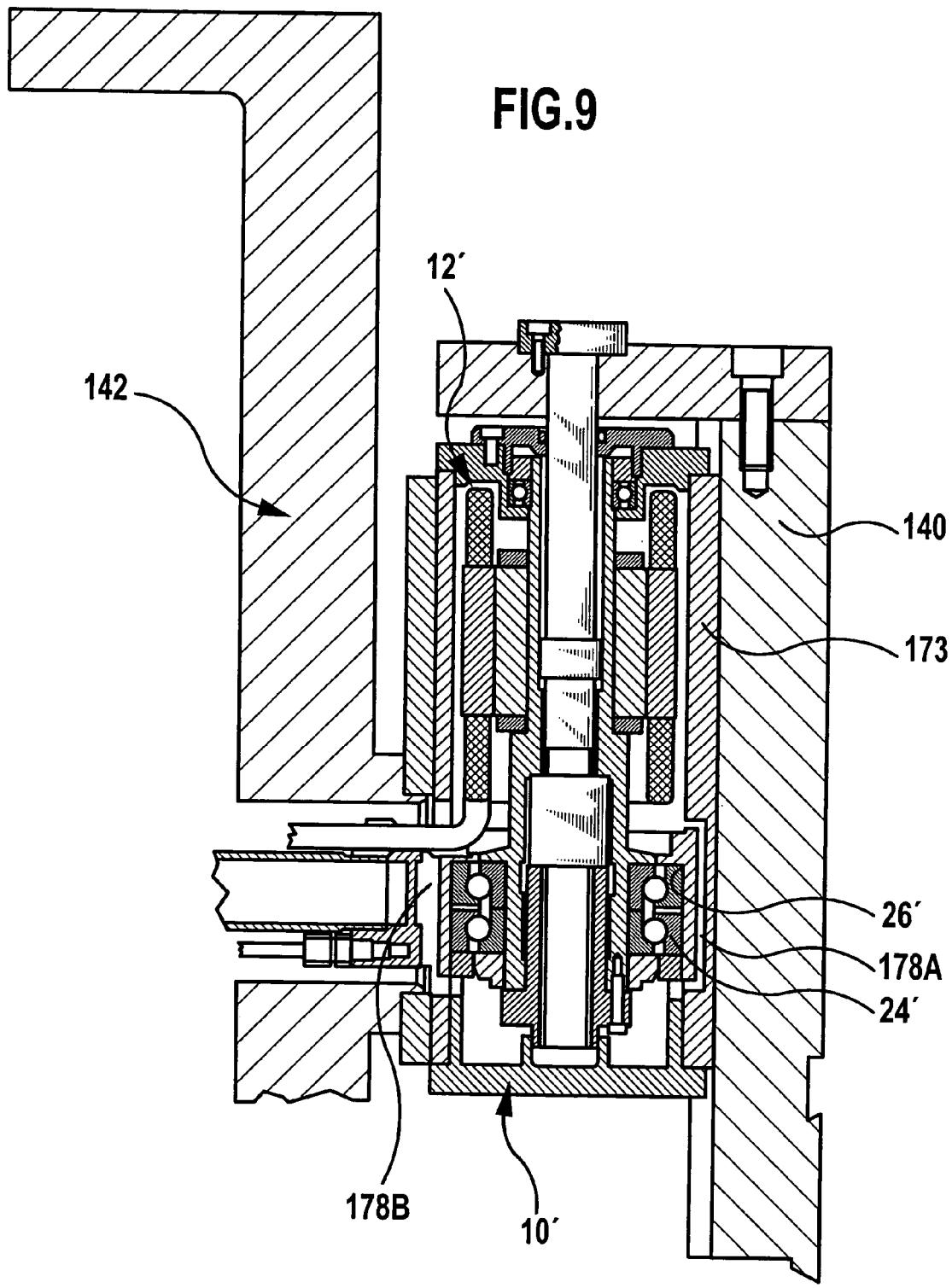

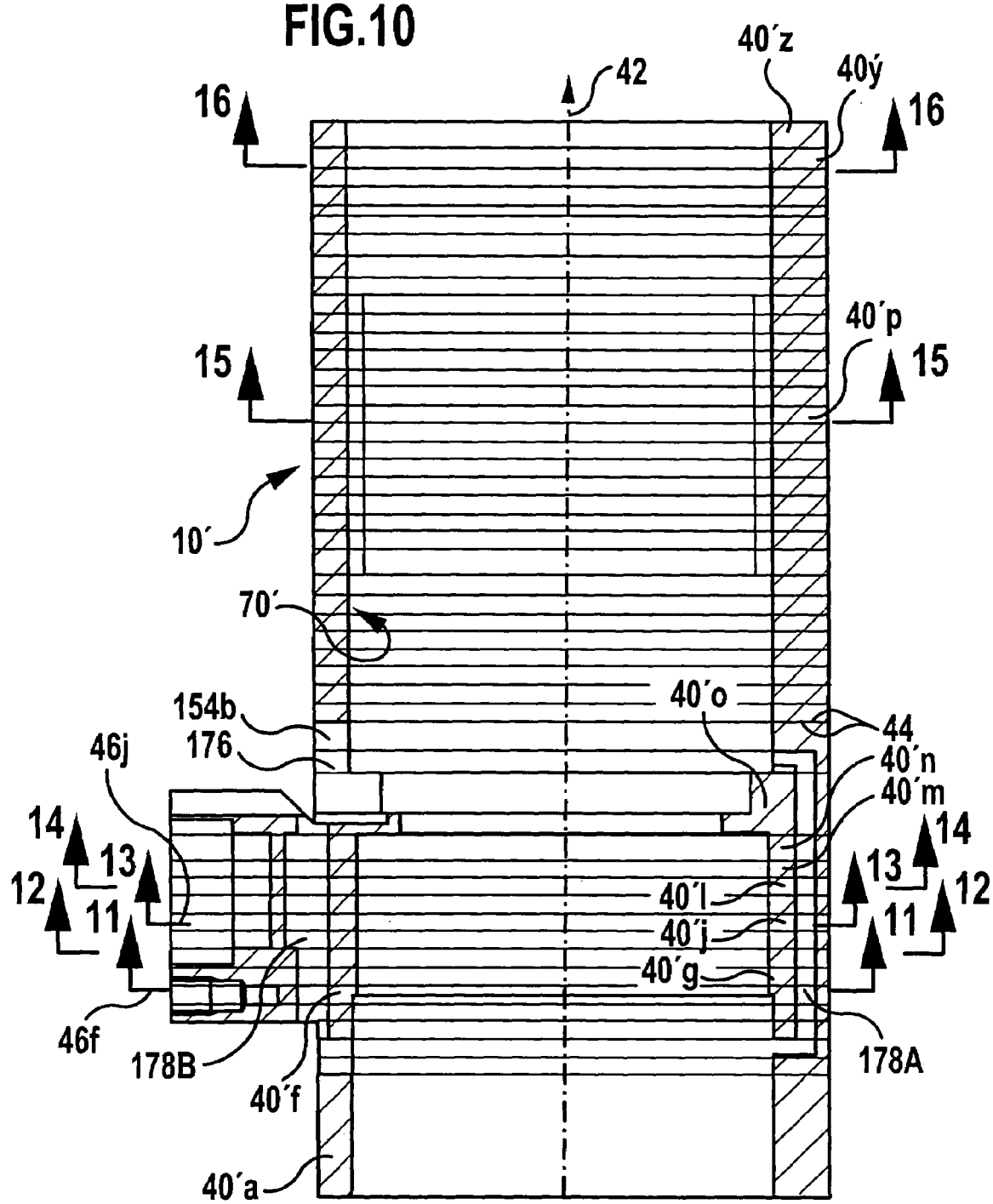

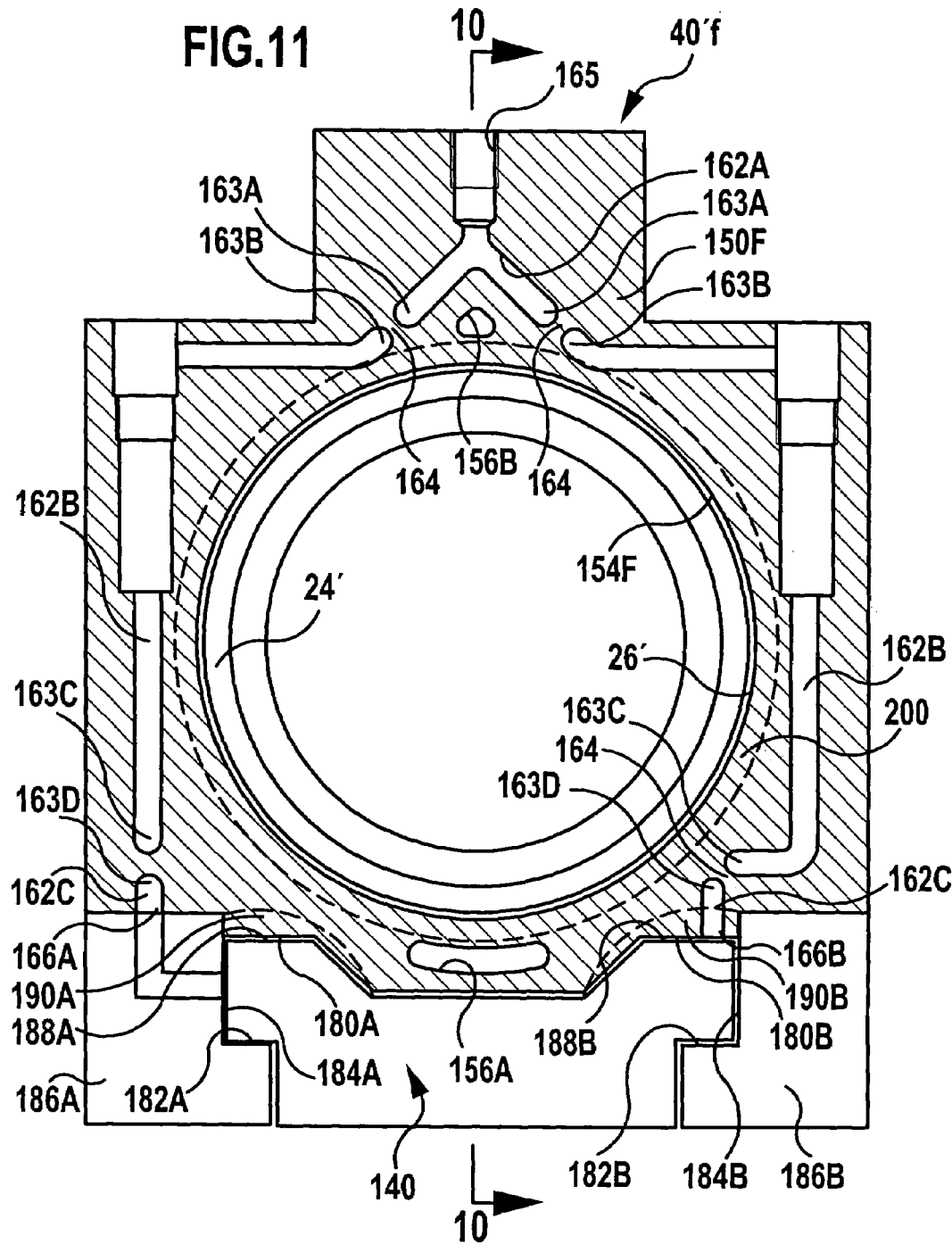

DRIVE HOUSING FOR MACHINE TOOL DRIVES

The present disclosure relates to the subject matter disclosed in International application No. PCT/EP02/08902 of Aug. 9, 2002, which is incorporated herein by reference in its entirety and for all purposes.

BACKGROUND OF THE INVENTION

The invention relates to a drive housing for machine tool drives.

Drive housings for machine tool drives are normally produced as cast parts.

In the case of such drive housings produced from a cast material, the problem is mainly that the provision of complex recesses for the insertion of the machine tool drive or for the insertion of machine elements or for the guidance of a cooling medium is problematic.

If the drive housing is to be able to be produced in a simple manner as a cast part, complex recesses cannot be realized. If complex recesses are absolutely necessary, the manufacture of the cast part is extremely complicated and, in this respect, the casting techniques are also extremely expensive. Even in the case of the most complex casting techniques, certain types of recess can no longer be suitably realized.

The object underlying the invention is therefore to provide a drive housing for machine tool drives which offers the possibility, with simple production technology, of not being subject to any restrictions whatsoever with respect to the recesses to be provided.

SUMMARY OF THE INVENTION

This object is accomplished in accordance with the invention, in the case of a drive housing for machine tool drives, in that this comprises a plurality of segments which are stacked in a stacking direction, cut out from flat material and extend in stacking planes transversely to the stacking direction and each of which has continuous material web systems which extend in such a manner that segments following one another in stacking direction abut on one another with their material web systems, thereby forming overlapping surfaces, and are connected to one another areally and with a material fit in the area of their overlapping surfaces.

The advantage of this solution is to be seen in the fact that the construction of the drive housing from a stack of segments allows the material web systems to be cut out in a more or less optional shape and, as a result, the possibility to be offered of realizing recesses of any optional complexity by way of a suitable construction of the material web systems in the drive housing.

In this respect, the production technology for the drive housing is independent of the complexity of the material web systems and, therefore, of the recesses in the drive housing which result therefrom. The only marginal condition consists in the fact that the material web systems must have surfaces overlapping with one another, in the area of which an areal connection with a material fit can be realized between the individual segments.

An areal connection with a material fit can be realized in several ways, for example, by way of adhesion.

A particularly advantageous solution does, however, provide for the areal connection with a material fit to be brought about by means of a solder layer.

A solder layer of this type has the advantage that the individual segments may be piled as a stack to form a blank for the drive housing, wherein capillary gaps exist between the segments, into which the solder layer is then drawn during heating up on account of the capillary effect. With a suitable supply of solder material in the area of the overlapping surfaces, a connection with a material fit over the entire surface may preferably be created in the area of the overlapping surfaces between the segments.

In order to be able to produce the segments in as simple a manner as possible, one particularly favorable solution provides for the material web systems, at least in the case of some of the segments, to have cutouts passing through the segments over their entire thickness. This means that the cutouts always pass through the entire material thickness of the material web systems and so the segments can be produced in an optionally simple manner by means of a cutting process, for example, laser cutting.

The cutouts can, in this respect, have any optional shape.

In order, however, to bring about a suitable stability, it is particularly favorable when the material web systems enclose the cutouts at least partially.

With respect to the type of cutouts and the solutions which can be achieved with them, the most varied of types are conceivable. For example, one advantageous solution provides for receiving cutouts to be provided in the segments which form a recess for accommodating a machine tool element, this recess extending over the segments in the stacking direction within the drive housing.

A machine tool element of this type can, in this respect, be the machine tool drive specified at the outset or any type of part which can be used in a machine tool, such as, for example, a supply line or delivery line for the machine tool drive, as well.

A different type of machine tool element can be parts of a drive train or parts of a displacement drive, such as, for example, of a drive for the slide of the machine tool.

In this respect, it is particularly advantageous when the recess formed by the receiving cutouts extends through the entire drive housing since, in this case, the assembly of the machine elements can later be realized in a simple manner.

Since heat is often generated by the machine elements and this should be advantageously discharged, it is provided in a particularly preferred embodiment of a drive housing for some of the segments to have wall webs which surround the receiving cutouts, have overlapping surfaces connected in stacking direction to preceding and subsequent material webs with a material fit and form a wall surrounding the recess with an improved heat conduction in the area of the wall webs.

The advantage of this solution is to be seen in the fact that areas with an improved heat conduction, which facilitate the discharge of heat from the recess, may be formed as a result of the wall webs which are of as narrow a construction as possible.

In this respect, the wall webs are preferably designed such that they form a wall separating the recess from a cooling medium so that the cooling medium can have direct contact with the wall webs and can draw off the heat from the wall webs.

In this respect, the wall webs are preferably designed such that they have a width in the stacking planes which varies along the same by less than a factor of two in order to be able to realize as uniform a heat conduction as possible through the wall webs.

In order to be able to realize as favorable a cooling as possible, it is preferably provided for the wall webs to extend at least over part of the circumference of the receiving cutout and, therefore, allow as far as possible a discharge of heat at the circumference of the receiving cutout.

A particularly favorable design of the wall webs provides for these to have an outer contour which faces away from the receiving cutout and the course of which essentially follows that of an inner contour of the wall webs facing the receiving cutout, i.e., for the width of the wall webs in the stacking planes to be approximately constant between the inner and outer contours.

In order to convey the necessary stability to the drive housing, it is preferably provided for segments with supporting webs, which are designed to be broader than the wall webs in the stacking planes, to follow in stacking direction on both sides of a segment with a wall web. This solution offers the advantage of, on the one hand, providing a favorable heat conduction away from the recess and, on the other hand, of maintaining the necessary stability, in particular, when machine elements supported in the recess are provided.

In this respect, several segments with a wall web can follow directly on from one another but these are advantageously enclosed between segments with supporting webs which essentially undertake the strengthening of the drive housing.

Since, in the case of the inventive solution, the thickness of the segments can, in principle, be freely selected, one embodiment of a drive housing which is of a particularly favorable construction provides for a segment with a wall web to be located between two segments with a supporting web so that the width of a wall web between two supporting webs, which is justifiable for reasons of stability, can be realized as far as possible by a single segment.

In the case of structures which must have a limited stability, the extension of the wall webs in stacking direction can, however, be even greater so that, for reasons of the produceability of the segments, several segments having a wall web can also follow directly one after the other, wherein the wall webs all preferably have surfaces overlapping with one another.

In order not to have to provide a separate stabilization for the machine tool drive, it is preferably provided for the sum of the material web systems connected to one another in the overlapping surfaces to form a spatially continuous, self-supporting supporting framework for the machine tool drive so that the machine tool drive itself can be mounted in the drive housing in a stable manner.

In this connection, the inventive solution likewise offers particular advantages with respect to absorbing the forces from the machine tool drive acting on the drive housing since the material web systems can be adapted to these forces at every location of the drive housing. For example, more stable material web systems can be arranged in those areas, in which large forces from the machine tool drive are active whereas, on the other hand, in those areas, in which almost no or low forces from the machine tool drive act on the drive housing, material web systems can be used which have as low a mass as possible so that in addition to the optimization of the introduction of force in the case of the inventive drive housing an optimization of the masses required and, therefore, to be accelerated where applicable is possible.

The material web systems preferably form a type of spatial areal supporting framework system, with which spaces can be realized between the individual supporting framework elements not only in stacking direction but also transversely to the stacking direction.

In this respect, the drive housing is preferably designed such that the supporting framework has material webs which are of a broader design in comparison with other material webs in the stacking planes and are arranged so as to extend in main load directions.

One advantageous development provides for the material webs forming the supporting framework to be designed as material web rings.

In addition, a stable and as simple a mounting as possible of the machine tool drive in the corresponding receiving means can be achieved. For this purpose, it is preferably provided for the receiving cutout of at least one of the segments to form a bearing seat for a bearing of the machine tool drive. This means that a bearing seat for the bearing of a machine tool drive can be formed directly by the receiving cutouts of at least one of the segments or of several segments and so the bearing seat can already be produced directly as a result of the production of the cutouts and, therefore, at least rough machining processes which are customary in the case of cast parts can be dispensed with.

In order to also facilitate a good cooling in the area of the bearing seat, one advantageous embodiment provides for the bearing seat to be formed by the receiving cutouts of several segments and for at least some of these segments to form wall webs which allow as good a flow of heat as possible. The resulting heat can therefore be discharged in an optimum manner in the area of the bearing seat with this type of wall web which has already been described, wherein these wall webs are preferably designed in the same way and also arranged between supporting webs in order to, again, provide the necessary stability in the area of the bearing seat.

In order, in addition, to be able to mount the drive housing in a suitable way, one advantageous solution provides for at least one of the segments to form a supporting surface for the drive housing with its outer contour. As a result, the type of mounting of the drive housing can also be incorporated into the design of the segments in an advantageous manner with the inventive solution so that the bearing surface can already be at least preliminarily worked as a result of the cutting out of the segments and, therefore, complicated machining processes can be dispensed with.

In addition, one advantageous design of an inventive drive housing provides for at least one of the segments to form a position-determining element of the drive housing.

Position-determining elements of this type can, for example, be any type of anchoring flange. However, such a position-determining element is also, for example, a toothed wheel which allows optional rotary positions of the drive housing to be set and determined.

The advantage of this solution is likewise to be seen in the fact that such position-determining elements may be provided in a simple manner as an integral component of the drive housing without special measures being required for this purpose.

For example, it would be complicated when constructing the drive housing using casting technology to integrally form holding flanges. It is, however, almost impossible to integrally form, for example, a toothed wheel during the construction of the drive housing using casting technology since in the case of casting technology the required stabilities cannot be realized.

In contrast to casting technology, the inventive solution does, however, offer in general the great advantage that the material stabilities of the individual segments of the drive housing can also be adapted to the respective load requirements. For example, a material with a greater rigidity can be used for the production of the segments in the area of a position-determining element or in the area of a bearing seat or in the area of supporting surfaces than in the areas of the drive housing, in which the areal loads, in particular, the surface loads are less.

In addition, no further details have been given in conjunction with the explanations for the individual embodiments of the inventive solution concerning the cooling.

One particularly advantageous embodiment of a drive housing provides, for example, for at least some of the segments to have cooling channel cutouts which form at least one cooling channel section of a cooling channel system extending through the drive housing.

In this respect, it is particularly advantageous when the cooling channel cutouts of segments following one another in stacking direction form cooling channel sections which extend through the drive housing with deviations. Deviations of this type improve the heat contact with the cooling medium guided through these cooling channel sections.

This is a considerable advantage of the inventive solution since, for example, in casting technology bends in cooling channel sections can either not be realized and/or only in an extremely complicated manner.

In this respect, it is even more advantageous when the cooling channel sections extend through the drive housing with multiple deviations. Such a realization of multiple deviations is more or less impossible in casting technology but does allow an increase in the transfer of heat to the cooling medium.

A particularly favorable form of realization provides for the cooling channel section to extend approximately in a direction transverse to the axis of the stack.

Although the segments are stacked in a stacking direction and the cutouts are preferably provided in the stacking direction with overlaps, an extension of the cooling channel section transverse to the stacking direction may also be realized with the inventive solution.

In the case of such a cooling channel section extending transverse to the stacking direction, a particularly favorable discharge of heat may be realized when the cooling channel section has meanders extending in the direction of the stacking direction and alternates between the cooling channel cutouts of at least two segments.

An embodiment which can be realized particularly favorably from a constructional point of view provides for the cooling channel section to extend transversely to the stacking direction in certain sections in one segment and to be closed in stacking direction by the material web systems of the preceding and the next following segment.

In the case of such a cooling channel section, a particularly expedient meandering shape can easily be formed from a constructional point of view when the cooling channel section changes during the course of its extension transversely to the axis of the stack from one segment into the next following segment and then back into the one segment.

Alternatively or in addition to the cooling channel systems described thus far, one advantageous embodiment provides for some of the segments to have cooling channel cutouts which supplement one another to form a cooling channel section extending in stacking direction.

In this respect, it is particularly favorable when the cooling channel cutouts supplement one another in the segments to form a cooling channel section which extends in stacking direction but has at least one meander transverse to the stacking direction so that a particularly favorable transfer of heat to the cooling medium can also be realized in these cooling channel sections.

In this respect, all the forms of realization and forms of extension of such a cooling channel section, in particular, with meanders can be realized in the case of the inventive solution of the drive housing.

A particularly favorable form provides for the cooling channel section to have a shape bent in the stacking planes so that the cooling channel section may be adapted, for example, to a cutout forming a bearing seat and, therefore, as uniform a transfer of heat as possible from the bearing seat to the cooling medium guided in the cooling channel section is brought about at least in part of the cooling channel section. In addition, the stability can be taken into consideration in a particularly favorable manner with such a design of the cooling channel section since the wall between the cooling channel section and the bearing seat can be adapted to the stability requirements in a simple manner.

A particularly favorable form provides for the cooling channel section to have meanders extending transversely to the stacking direction, wherein the meanders preferably extend, in this case, in a shape bent in the stacking planes.

It has already been explained in conjunction with the preceding embodiments that materials with different strengths can be made available in the individual segments.

This would be possible, for example, in that the individual segments can be produced from the beginning from materials having different strengths, for example, steel and hardened steel or light metal or the like.

Such a selection of material would relate to the entire material web system of the respective segment.

In order, however, to be able to vary the material parameters selectively and, in particular, when harder material is intended to be available at least in certain locations but not to influence the material properties in other areas of the material web systems, in particular, the machining possibilities negatively, it is preferably provided for the material web systems of some of the segments to be produced from a hardenable material.

For example, it would be conceivable when using a hardenable material to harden the material web systems in certain sections prior to the assembly of the drive housing and to then produce the drive housing as a whole.

Another advantageous possibility does, however, provide for the material web systems to be produced from a material which can be hardened following production of the drive housing.

Such a material which can be hardened following production of the drive housing has the advantage that the hardened areas can be produced after production of the drive housing as a whole and, therefore, an even more selective hardening of the desired areas is possible.

This solution is also particularly advantageous due to the fact that, with it, the connection of the segments to one another with a material fit, for example, by way of hard soldering does not have any negative influence on the hardness and, in particular, no varying negative influence dependent on the segments since the hardening of all the material web systems of different segments touching the desired area is brought about after the connection thereof with a material fit.

During the hardening of the material of the material web systems, the most varied of procedures are conceivable. For example, it would be conceivable to harden the material web systems by way of diffusion hardening or laser hardening.

One particularly advantageous procedure provides for the material to be hardenable by way of induction hardening.

In this respect, it has proven to be particularly advantageous when a hardening of the material of the material web systems takes place only in certain areas in order not to make any machining in other areas of the material web systems, which do not have to be hardened, more difficult.

In order to be able to preferably use a drive housing produced from segments in accordance with the invention at the same time for the purpose of guiding other, for example, movable machine elements, it is preferably provided for the drive housing to have a guide surface for a movable machine element which is formed by at least one segment.

The most varied of parts are to be understood as a movable machine element of this type. For example, a movable machine element of this type could be a rotating shaft or a guide member moving linearly, for example, a slide for workpieces or tools.

The guide surface can extend not only transversely to the stacking direction. However, it is also conceivable within the scope of the inventive solution for the guide surface to extend in stacking direction over several segments. In this case, the guide surface is preferably produced by way of subsequent machining of the drive housing in the area of these segments with the required surface quality.

Since guide surfaces are generally limited surface areas of the drive housing, it is preferably provided for the guide surface to be formed by a surface of a section of the material web system of the respective segment.

The surface can be located in the area of an inner contour of the respective segment; it is, however, also conceivable for the surface to be located in the area of an outer contour of the respective segment.

Particularly in the case of guide surfaces extending in stacking direction, these are formed by the surface of a narrow side or several narrow sides of several material web systems in a section thereof.

In order to obtain as high a quality and strength of the guide surface as possible, it is preferably provided for the section of the material web system to be hardened which does, however, presuppose that the material web system is, in this case, produced from a hardenable material.

In this case, the guide surface is formed by a hardened surface.

In this respect, it is particularly expedient when the guide surface has a hardening progression essentially constant in stacking direction.

The guide surface can, in principle, be a guide surface for every type of machine element supported on it. For example, such a machine element could be supported by rolling on this guide surface.

Within the scope of the inventive solution, it is, however, favorable when the guide surface is a sliding guide surface.

Additional features and advantages of the invention are the subject matter of the following description as well as the drawings illustrating one embodiment which does not limit the invention in accordance with the preceding comments.

BRIEF DESCRIPTION OF THE DRAWINGS

FIG. 9 shows a section parallel to a stacking direction through a section of a machine tool, in which a second embodiment of an inventive drive housing is provided in the form of a drive housing of a slide;

FIG. 10 shows an enlarged illustration of the second embodiment of the drive housing illustrated in FIG. 9 in the same sectional view as FIG. 1 as well as along the lines 10—10 in FIG. 11;

FIG. 11 shows a section along line 11—11 in FIG. 10;

DETAILED DESCRIPTION OF THE INVENTION

Figure 1:
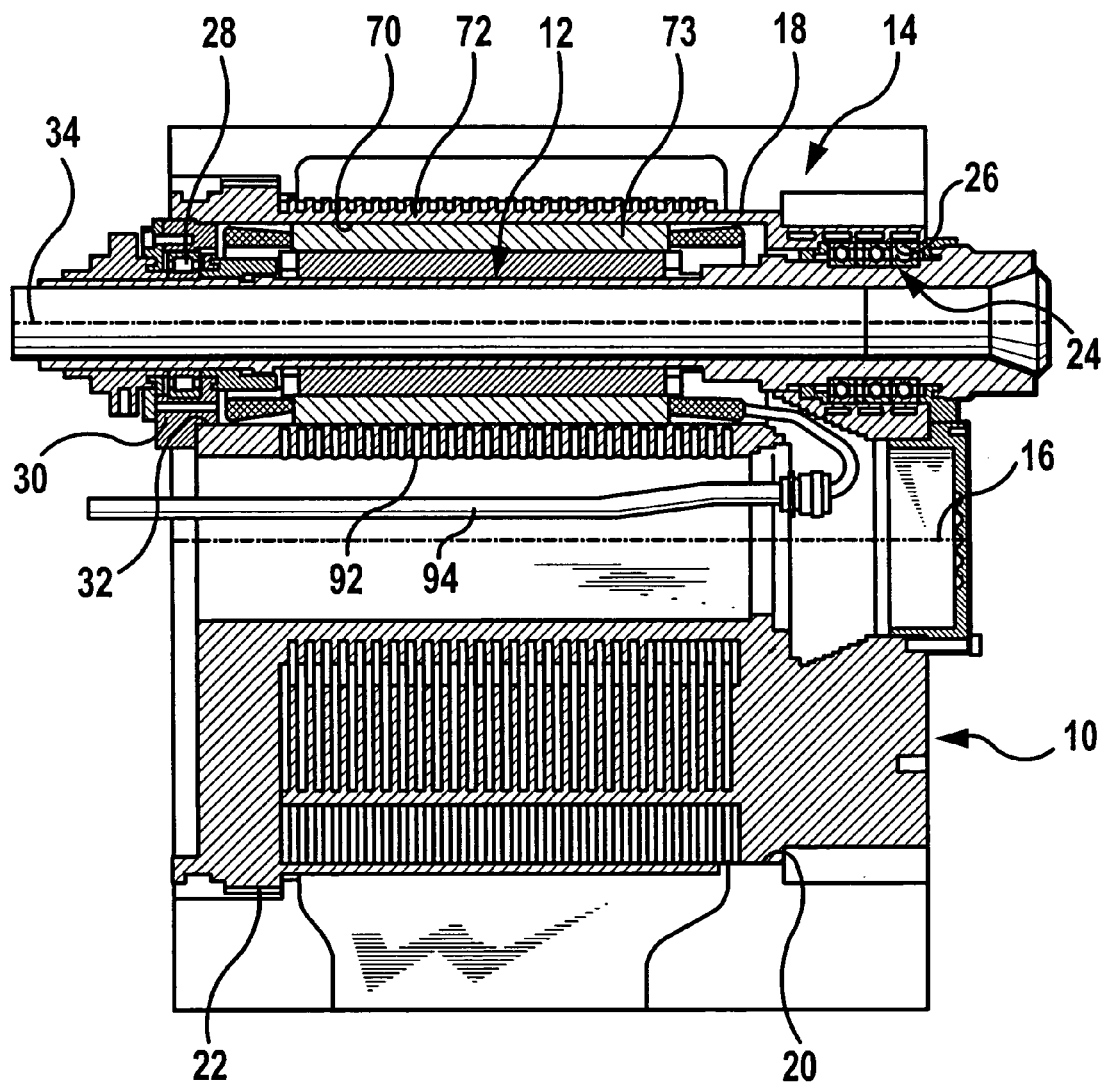
FIG. 1 shows a section parallel to a stacking direction through a section of a machine tool, in which a first embodiment of an inventive drive housing is provided in the form of a spindle drum.

A first embodiment of a drive housing, designated as a whole as 10 and illustrated in FIG. 1, for a machine tool drive designated as a whole as 12 represents a spindle drum, in which a plurality of motor spindles are arranged as machine tool drives.

In this respect, the spindle drum 10 is rotatable as a whole about a spindle drum axis 16 in part of an upright 14 forming a machine frame but is mounted so that it can be fixed in the individual rotary positions.

The mounting of the spindle drum 16 in the upright 14 is partially brought about by outer supporting surfaces 18 which abut on corresponding supporting surfaces 20 of the upright 14.

Furthermore, the spindle drum 10 representing the drive housing can be driven so as to perform rotary movements about the spindle drum axis 16 by an external toothed wheel 22, in which a pinion, which is not illustrated in the drawings, engages.

The working spindle 12 designed as a spindle motor 12 is, for its part, mounted in the spindle drum 10 so as to be rotatable about a spindle axis 34 by a front spindle bearing 24 which is mounted so as to be supported on a first bearing seat 26 of the spindle drum 10 and by a rear spindle bearing 28 which is supported on a second bearing seat 32 of the spindle drum via a holding ring 30.

Figure 2:
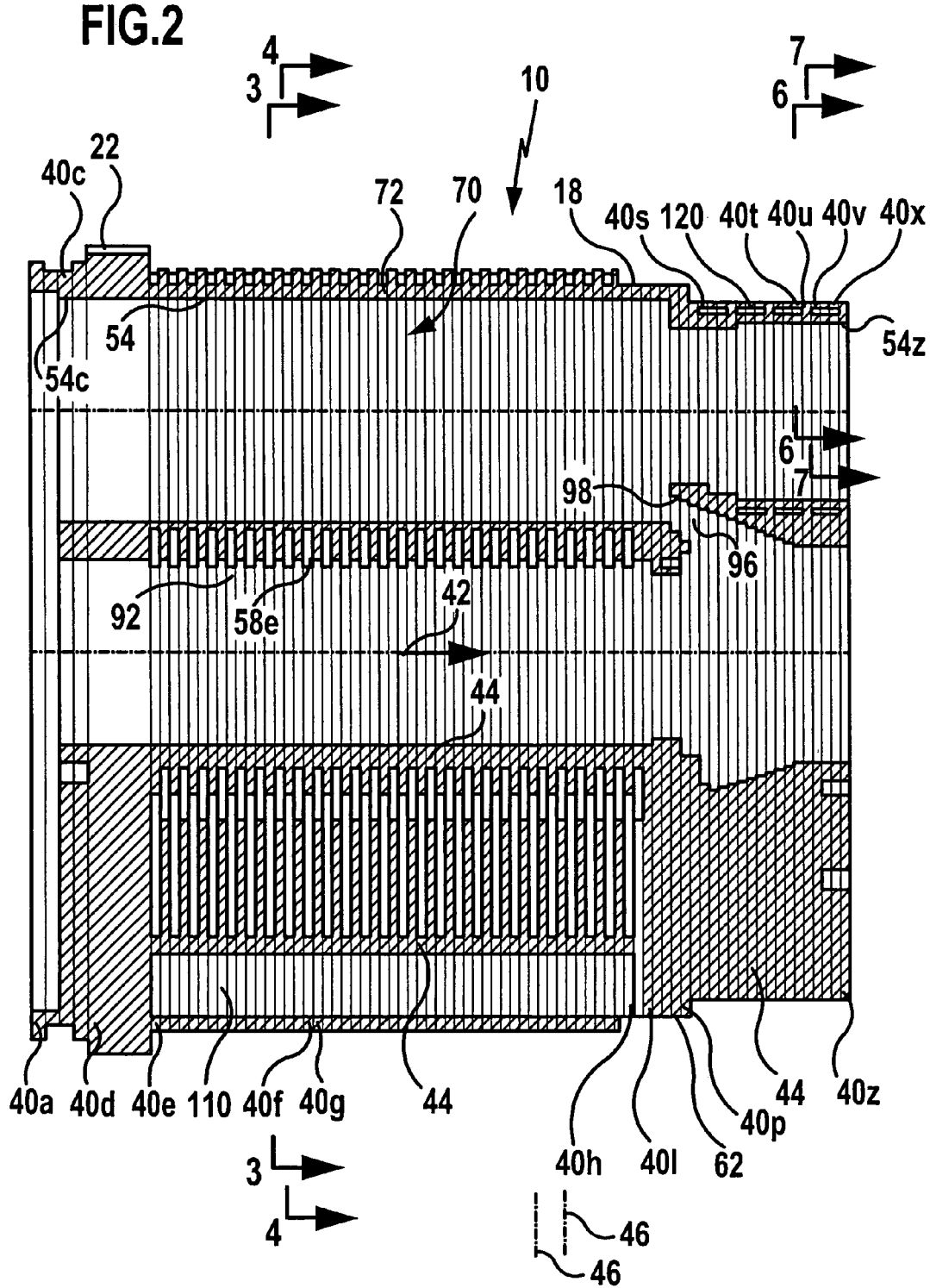
FIG. 2 shows an enlarged section through the first embodiment of the drive housing illustrated in FIG. 1 along line 2—2 in FIG. 3.
Figure 3:
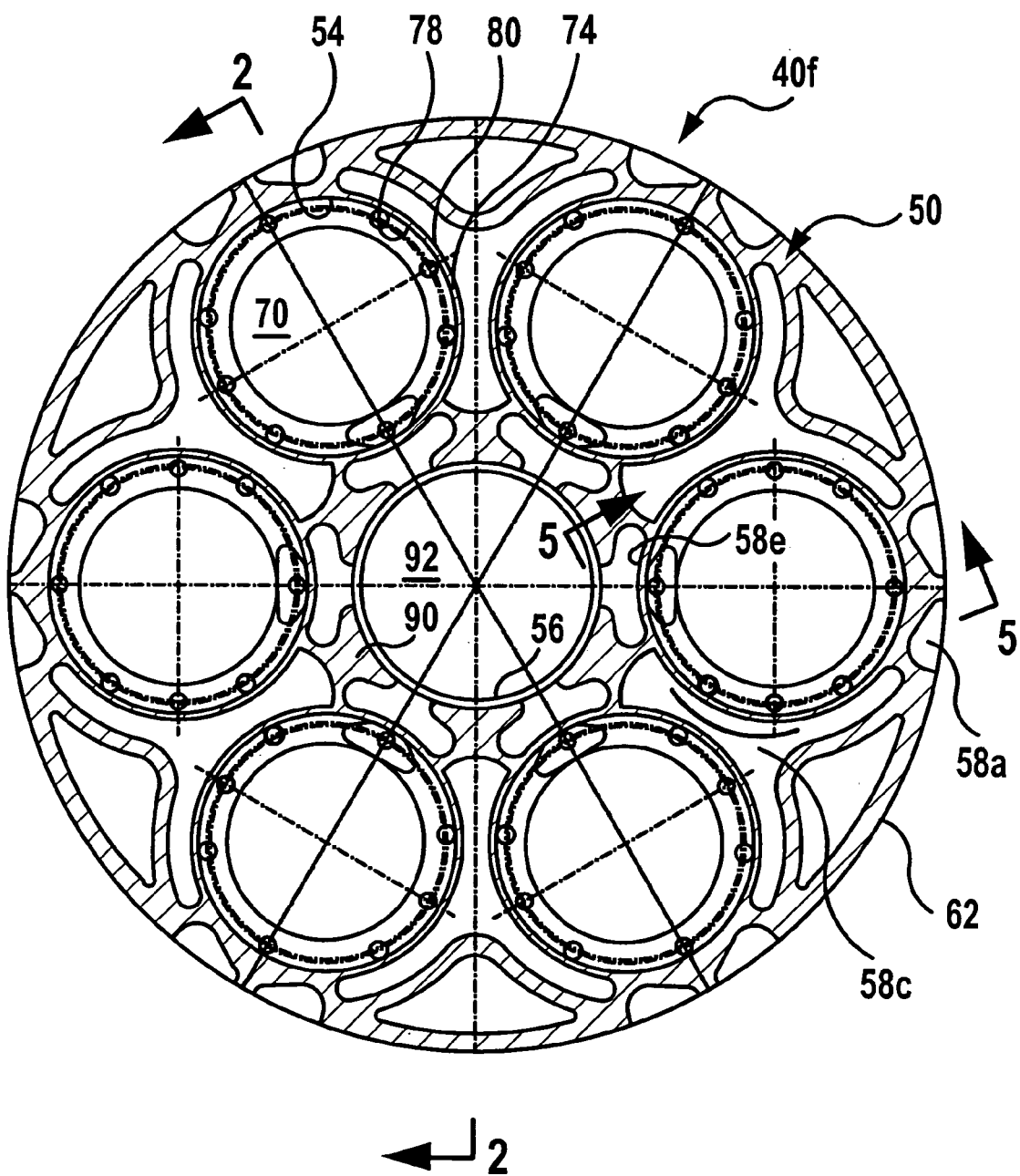
FIG. 3 shows a section along line 3—3 in FIG. 2.
Figure 4:
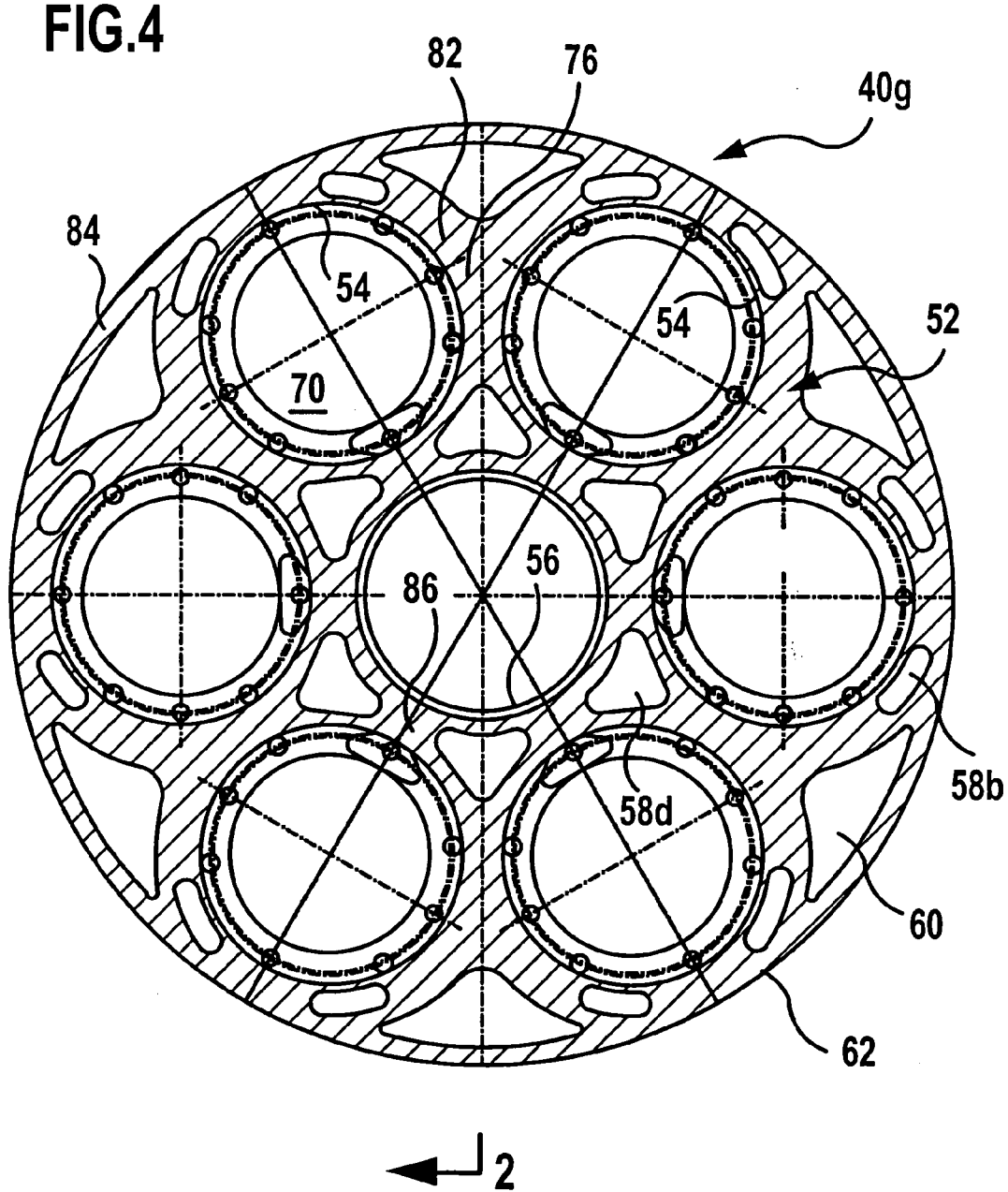
FIG. 4 shows a section along line 4—4 in FIG. 2.

As illustrated in FIGS. 2, 3 and 4, the drive housing 10 designed as a spindle drum is formed from a plurality of segments 40a to 40z which are all cut out from flat material, for example, steel plates and stacked on top of one another in a stacking direction 42 which, in this case, extends parallel to the axis 16 of the spindle drum and are connected to one another with a material fit, for example, by soldering by means of a hard solder process in the area of overlapping surfaces 44 between adjacent segments 40 abutting on one another, wherein for the connection of the segments 40 with a material fit overlapping surfaces 44 form capillary gaps, into which the solder material flows during heating and is distributed in them over the entire overlapping surfaces 44.

In this respect, the individual segments 40 are preferably provided with surfaces plane parallel to one another and extend in stacking planes 46 extending at right angles to the stacking direction 42, wherein their thickness in the stacking direction 42 can vary freely.

As illustrated in FIGS. 3 and 4, the segments 40e to 40h are preferably formed by material web systems which are designated as a whole as 50 and 52 and are provided with a plurality of cutouts 54, 56, 58 and 60 which respectively extend over the entire thickness of the material web systems 50 and 52 through the respective segment 40 and are preferably produced by laser cutting of the flat material, in particular, the flat steel.

In addition, an outer contour 62 of the segments 40 is also produced by laser cutting.

As clarified by FIG. 2, the cutouts 54c to 54z serving as receiving cutouts form altogether, for example, a recess 70 which extends parallel to the stacking direction 42 for accommodating a machine tool element, in this case the working spindle 12, wherein the recess 70 extends through the entire drive housing 10.

The recess 70 is enclosed in the area between the segments 40e to 40h by a cooled wall 72 which is formed by alternating wall webs 74, illustrated with the example of the segment 40f, and supporting webs 76, illustrated with the example of the segment 40g.

In order to bring about as efficient a cooling of the machine tool drive as possible, a stator 73 thereof is preferably seated directly on the cooled wall 72 and is, therefore, in a position to introduce the discharged heat directly into the cooled wall 72.

The wall webs 74 extend to a considerable part around the recess 70 and have in the stacking planes 46 a width which is clearly less than a width of the supporting webs 76 which likewise extend essentially in a closed manner around the recess 70.

The wall webs 70 thereby separate cooling medium present in the cutouts 58 serving as cooling channel cutouts from the recess 70, wherein the wall webs 74 are designed such that they ensure a good heat conduction between an inner contour 78 contributing to the formation of an inner wall surface facing the machine tool drive 12 and an outer contour 80 facing the cooling medium in order to be able to discharge the heat from the inner surface of the cooled wall 72 efficiently.

On the other hand, the supporting webs 76 have a greater width in the stacking planes 46 and extend, in addition, between cooling channel cutouts 54 located next to one another in the same segment 40g so that they form around each cutout 54 a supporting ring 82 which is located between an outer outer ring 84 forming the outer contour 62 of the segment 40g and an inner ring 86 which supports the supporting rings 82 in the interior of the drive housing and surrounds the cutout 56.

As a result, the supporting rings 82 surrounding the cutouts 54, the outer ring 84 and the inner ring 86 form in the segments 40g the material web system 52 thereof.

On the other hand, the material web system 50 of the segment 40f is formed, on the one hand, by the wall webs 74 already described which essentially surround the receiving cutouts 54 and merge into an outer ring 88 contributing to the outer contour 62 and are connected to one another in an inner area of the segments 40f via intermediate webs 90.

The material web system 50 of the segment 40f contributes only to a small degree to the stability of the drive housing 10 in a direction transverse to the stacking direction whereas the predominant contributions to this stability are supplied by the material web system 52 of the segment 40g.

However, each material web system 50 connects two material web systems 52 arranged on either side thereof so that, altogether, the material web systems 50 and 52 of all the segments 40, for example, the segments 40e to 40h form a spatially continuous, self-supporting supporting framework which already has great stability in the stacking direction 42 on account of the segments 40 located on top of one another and also has great stability transversely to the stacking direction 42 due to the segments 40g with material web systems 52 arranged alternatingly between the segments 40f with the material web systems 50.

In the interior of the cutouts 54, which form the respective recesses 70 for accommodating the machine tool drives 12, the cutouts 56 of the segments 40 form a recess 92 which likewise extends in stacking direction through the entire drive housing 10 and, as illustrated in FIG. 1, serves to accommodate machine elements 94, for example, supply lines to the machine tool drives 12.

In this respect, the recess 92 is preferably connected to the respective recesses 70 via a side channel 96 which is formed in the area of the segments 40l to 40p by suitably shaped cutouts 98 and, in this respect, preferably extends at an angle, in particular, at an acute angle to the stacking direction 42 from the recess 92 into the respective recess 70.

Figure 5:
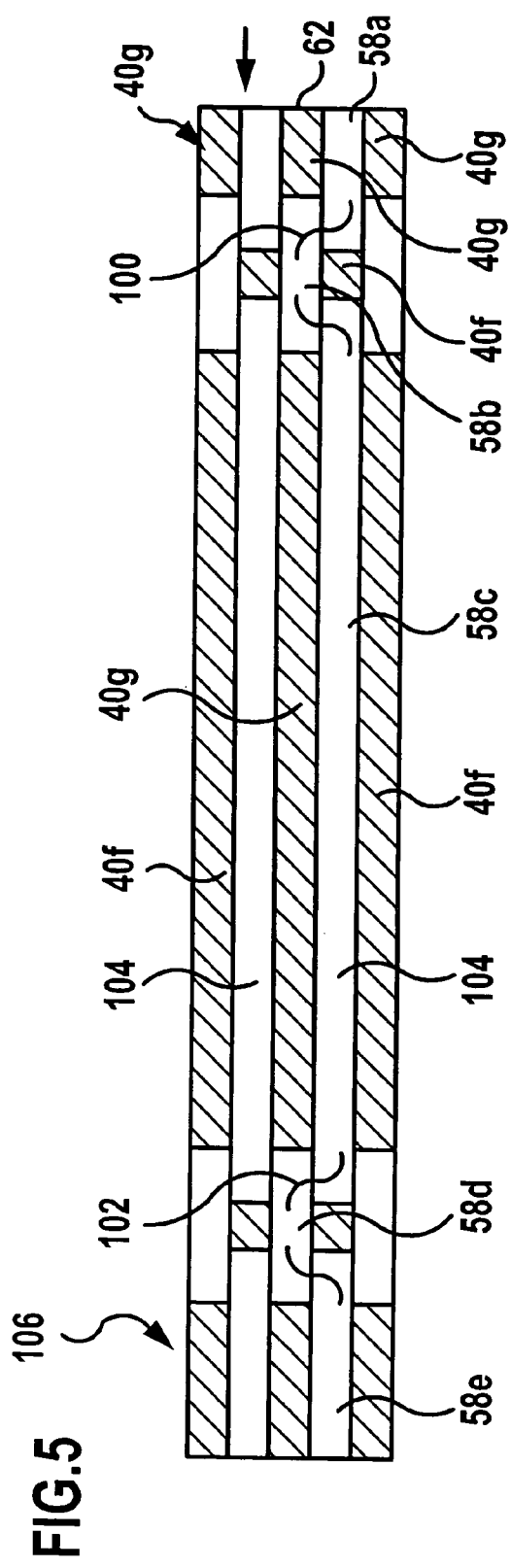
FIG. 5 shows a section along the curved, dash-dot line 5—5 in FIG. 3.

Furthermore, the recess 92, as will be explained later, serves to discharge a cooling medium. For the efficient cooling of the cooled wall 72, in particular, in the area of the wall webs 74, the segments 40g and 40f are, as illustrated in FIGS. 3 and 4, provided with the cutouts 58 which are designed as cooling channel cutouts and are arranged such that the cutouts 58A, 58C and 58E in the segment 40f partially overlap with the cutouts 58B and 58D in the segment 40g and, altogether, form a cooling channel section 104 extending in a meandering manner transversely to the stacking direction 42, as illustrated in a detailed section in FIG. 5.

A cooling medium thus enters the cutout 58A of the segment 40f from the outer contour 62 into the space between two segments 40g formed by the cutout 58A and then has the possibility, on account of the overlapping of the cutout 58A with the cutout 58B in the segment 40g, of forming a meander 100 through the cutout 58B and of then entering the cutout 58C again.

The cooling medium, for example, cooling air then flows along the cutout 58C in the segment 40f into the cutout 58D in the segment 40g, wherein the cooling medium then passes through the cutout 58D in the form of a meander 102 in order to enter the cutout 58E of the segment 40f again and, on account of the fact that the segment 40e is open towards the recess 92, to enter the recess 92, through which the cooling medium is discharged, for example, in a direction contrary to the stacking direction 42.

As a result, the recess 92 has not only the function of a receiving means but also of a cooling channel section.

Therefore, the recesses 58A to E of two adjacent segments 40f and 40g form a cooling channel section which is designated as a whole as 104 and extends with its main direction transversely to the stacking direction 42 and, in this respect, forms two meanders 100 and 102 in stacking direction and extends from the outer contour 62 of the drive housing 10 as far as the recess 92.

In this respect, an efficient cooling, in particular, of the wall webs 74 is brought about by the cooling medium flowing through this cooling channel section 104 and, therefore, an efficient cooling of the wall 72 as a whole, which is formed in sections by the wall webs 74, on account of its small width in the stacking planes 46.

The cooling channel sections 104 do not, however, extend in a manner isolated from one another but on account of the fact that a segment corresponding to the segment 40f follows a segment 40g, a connection between the individual cooling channel segments 104 also exists in stacking direction 52 in the area of the cutouts 58B and 58D which are located in congruence relative to one another and in the area of the respective overlapping of these cutouts 58B and 58D with the cutouts 58A, 58C and 58E and these cooling channel segments therefore form, altogether, a continuous cooling channel system 106 which comprises, on the one hand, the cooling channel sections 104 and, in addition, the recess 92, as well, as central channel.

In addition, the cutouts 60 in the individual segments, which are preferably located in all the segments 40e to 40h so as to be congruent, likewise form a channel 110 which, as a hollow space, does, however, serve the purpose of, for example, saving on weight.

Figure 8:
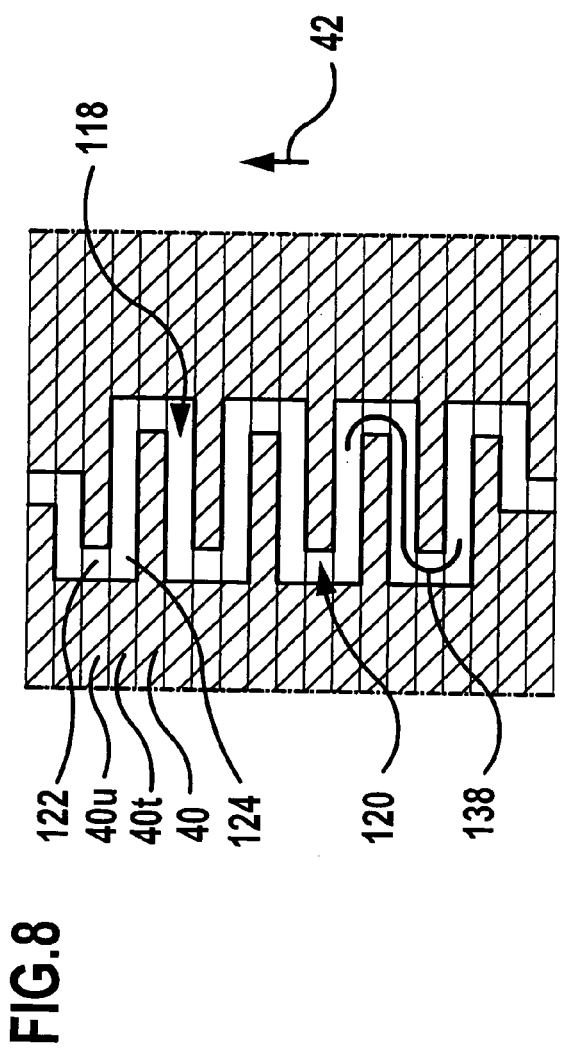
FIG. 8 shows a section along the curved, dash-dot line 8—8 in FIG. 7.
Figure 6:
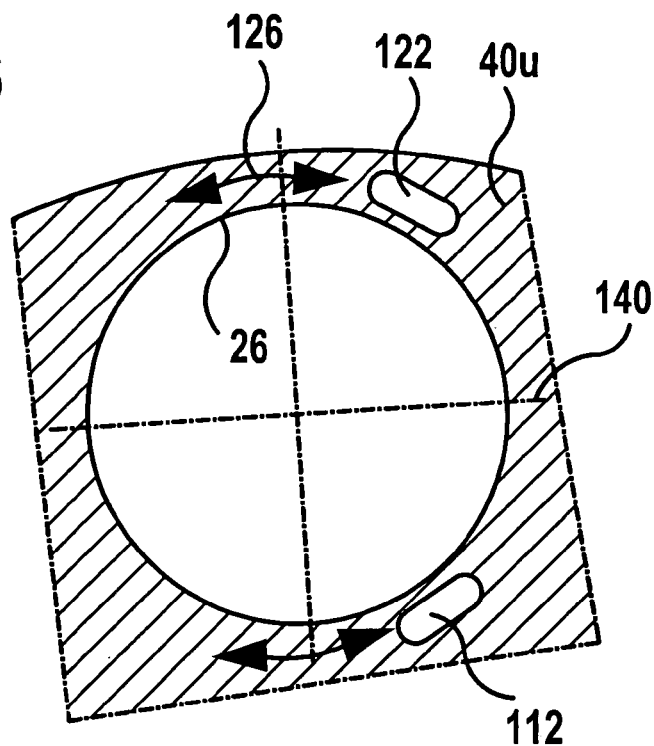
FIG. 6 shows a partial section along line 6—6 in FIG. 2.
Figure 7:
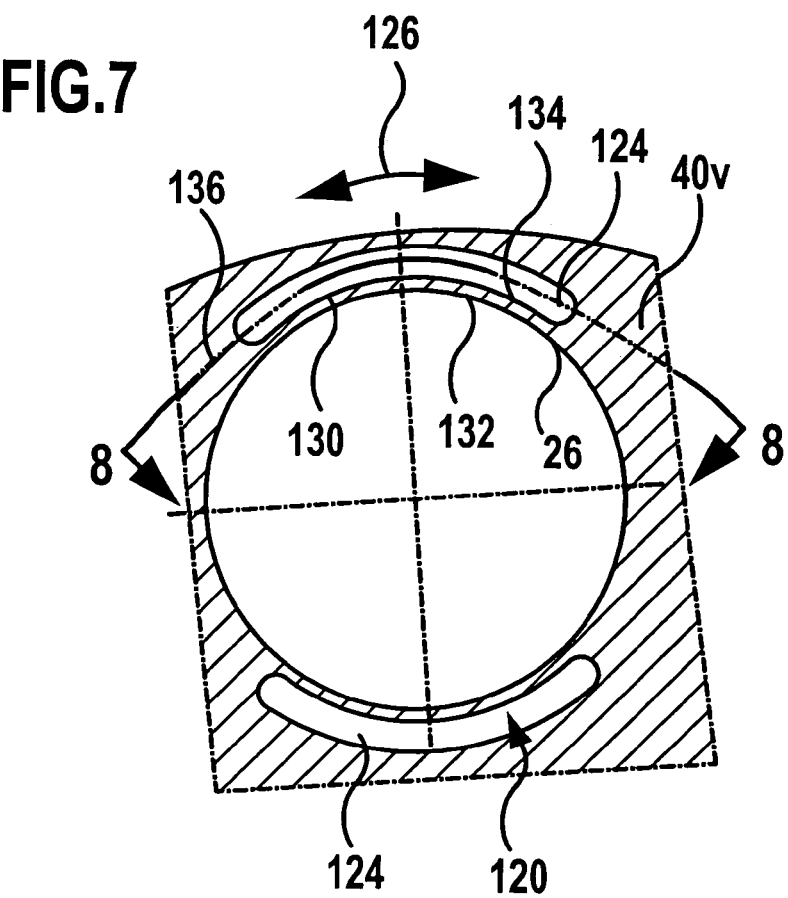
FIG. 7 shows a partial section along line 7—7 in FIG. 2.

Furthermore, a second cooling channel system 120 is provided in the inventive drive housing 10 in the area of the bearing seat 26, for example, between the segments 40s and 40z and this cooling channel system has in one segment 40u, as illustrated in FIGS. 6 to 8, for example, a cutout 122 which extends, for example, only through the segment 40u and overlaps with a cutout 124 in the segment 40t which extends in an azimuthal direction 126 around the bearing seat 26, wherein a wall web 130 again remains between the cutout 124 and the bearing seat 26 and this has a small width in the direction of the stacking planes 46 in order to bring about as good a transfer of heat as possible between an inner contour 132 of the wall web and an outer contour 134 of the wall web limiting the cutout 124.

As a result, it is possible with the cooling channel system 120 to realize a cooling channel section 118 extending in stacking direction 42 and formed by the cutouts 122 and 124 of consecutive segments 40, this cooling channel section having meanders 138 which are located in a curved surface area 136 and extend transversely to the stacking direction 42.

In order to bring about as symmetric a cooling of the bearing seat 26 as possible, cooling systems 120 of this type are realized by means of cutouts mirrored by the bearing seat at a central plane 140 and so an essentially symmetric cooling of the bearing seat 26, which accommodates the front spindle bearing 24, can be achieved.

However, the segments 40 serve not only the purpose of realizing recesses 70 and 90 for accommodating machine tool drives 12 or machine elements or cooling channel systems 106 or 120 in a drive housing 10 but rather they can also serve the purpose of forming the supporting surfaces 18 for the mounting of the drive housing 10, wherein the supporting surfaces 18 are formed, for example, by the outer contour 62 of the segments 40l to 40p.

In addition, it is also possible to design a segment 40d such that its outer contour has the shape of the toothed wheel 22 which serves the purpose of driving the entire drive housing 10 in a rotating manner in the upright 14 so that the toothed wheel 22 is not, in this case, placed on the drive housing 10 as a separate part, as with conventional technology, but is rather an integral component of it due to the segment 40d.

In addition, it is also possible to realize the toothed wheel 22 by means of several segments 40, wherein the teeth of the toothed wheel 22 are produced directly during the cutting out of the segment 40d or the segments 40 corresponding to it from flat material, at least in their basic shape.

One embodiment of a drive housing, designated as a whole as 10', for a machine tool drive designated as a whole as 12', in this case a drive for a slide 140, is held on a machine frame 142, as illustrated in FIG. 9.

As illustrated in FIG. 10, the drive housing 10' is likewise formed from a plurality of segments 40'a to 40'z which are all cut out from flat material, for example, steel plates and are stacked on top of one another in the stacking direction 42 as well as connected to one another with a material fit, for example, by soldering by means of a hard soldering process in the area of overlapping surfaces 44 between adjacent segments, as has already been described in detail in conjunction with the first embodiment.

In this respect, the individual segments 40' with surfaces plane parallel to one another likewise extend parallel to stacking planes 48 which extend at right angles to the stacking direction 42, wherein the thickness of the segments in the stacking direction 42 can vary freely, as in the first embodiment.

As illustrated in FIG. 11, the segment 40f comprises, for example, a material web system 150f which is provided with a plurality of cutouts 154, 156A and 156B as well as 162A, 162B and 162C.

The material web system 150f has, however, in the same way as that described in the first embodiment, altogether continuous material webs.

In this respect, the cutouts 162A to 162C form, for example, a lubricant channel which extends to a considerable part in the stacking plane 46f through the drive housing 10' and supplies lubricant supplied to an entry opening 165 to exit openings 166A and 166B in the drive housing 10' around the cutouts 156B as well as 154.

However, the cutouts 162A, 162B and 162C are not connected to one another in order to ensure that the material web system 150 of the segment 40'f remains continuous.

As a result of the fact that the material web system 150f is designed to be continuous, respective material web areas 164 are provided between facing ends 163A and 163B of the cutouts 162A and 162B and likewise material web areas 164 between facing ends 163C and 163D of the cutouts 162B and 162C, these material web areas separating the respective ends 163A and 163B as well as 163C and 163D from one another.

Figure 12:
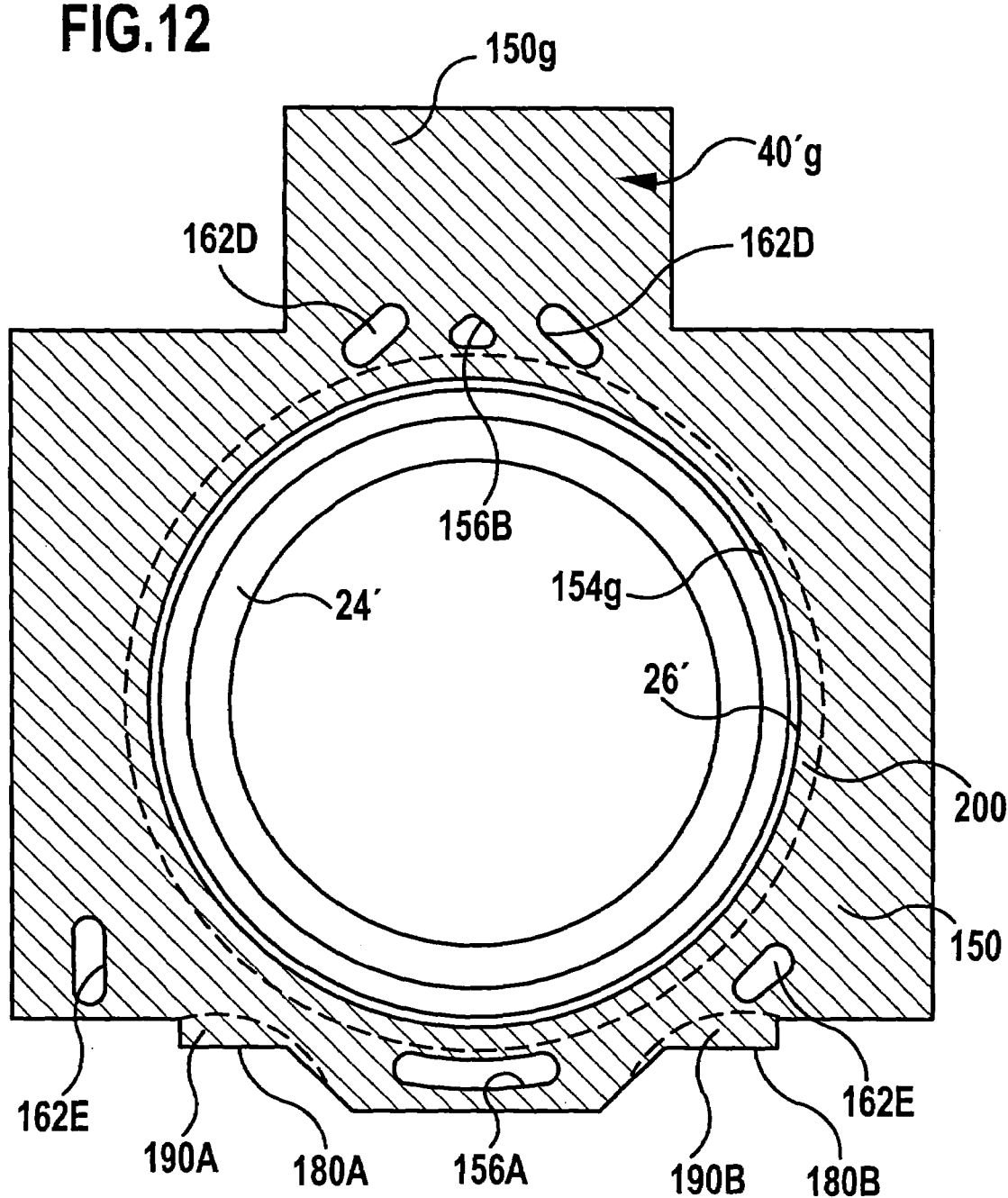
FIG. 12 shows a section along line 12—12 in FIG. 10.

For this reason, cutouts 162D and 162E, which are arranged so as to be overlapping with the ends 163A and 163B as well as 163C and 163D of the cutouts 162A and 162B as well as 162B and 162C and therefore represent connections between these cutouts in order to allow a flow of lubricant from the cutout 162A into the cutouts 162B and from the cutouts 162B into the cutouts 162C, are provided in addition to the cutouts 154 as well as 156A and 156B in the next following segment 40'g illustrated in FIG. 12.

The cutouts 162D and 162E therefore serve the purpose of bridging the material web areas 164 and 164 between the facing ends 163A and 163B as well as 163C and 163D of the cutouts 162A and 162B as well as 162B and 162C.

Figure 13:
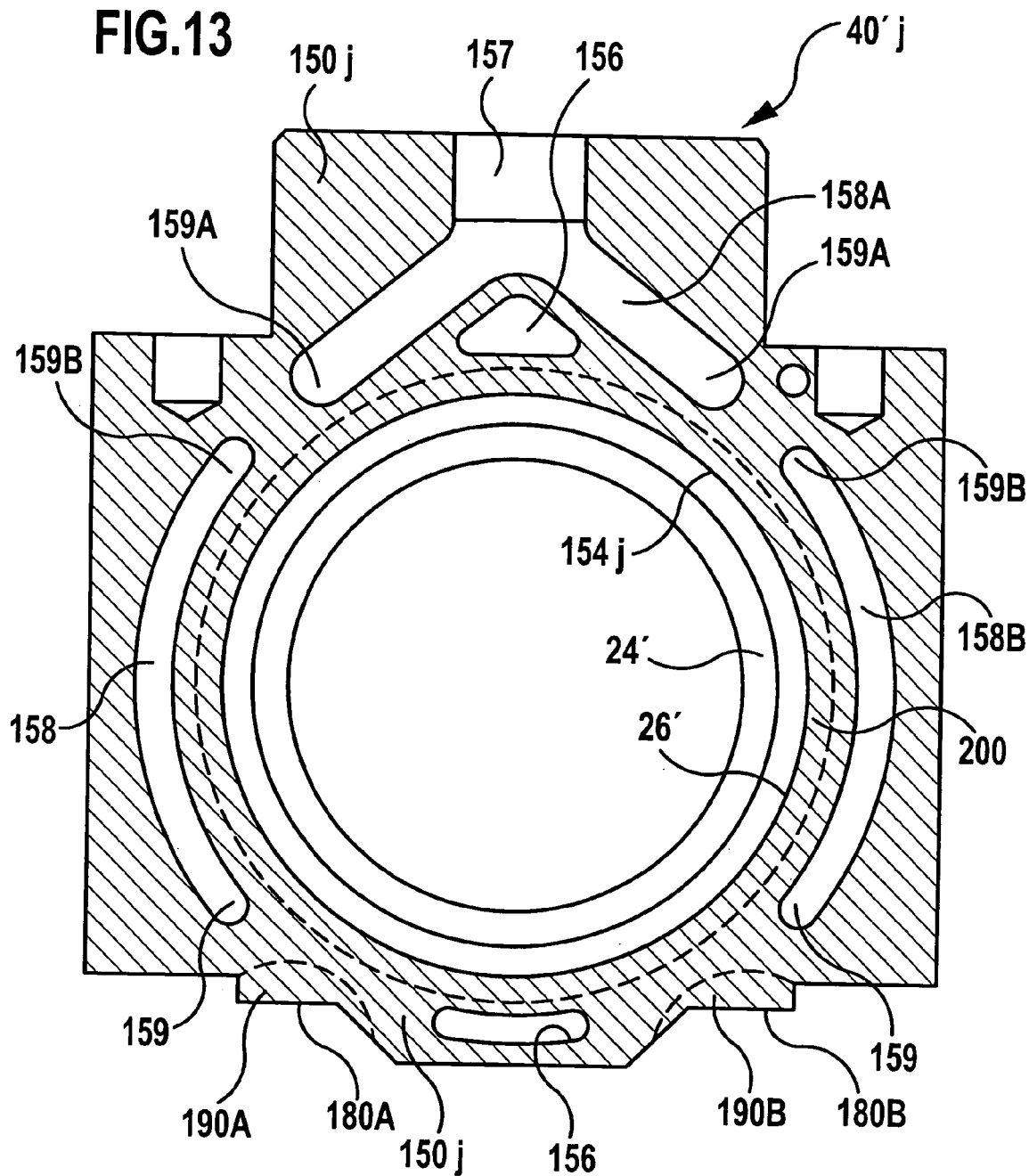
FIG. 13 shows a section along line 13—13 in FIG. 10.

In one segment 40'j, illustrated in FIG. 13, the cutouts 162 for lubricant are no longer present but rather a cutout 158A is provided which, proceeding from a cooling air inlet 157, is forked as far as ends 159A which are arranged so as to face ends 159B of the cutouts 158B, wherein the cutouts 158B are located on opposite sides of the section 154j.

Figure 14:
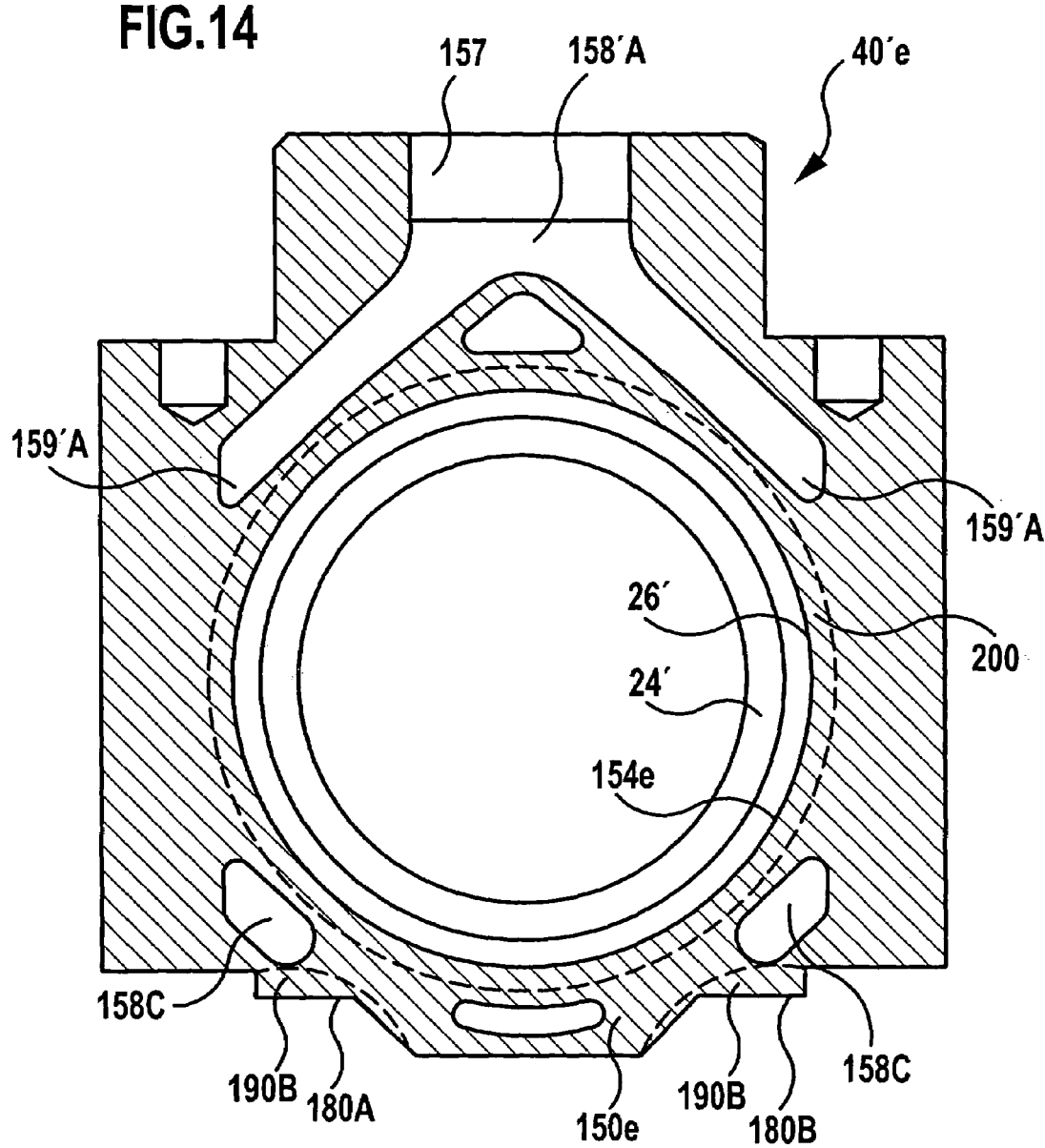
FIG. 14 shows a section along line 14—14 in FIG. 10.

In the segment 40'l, illustrated on an enlarged scale in FIG. 14, the cutout 158'A is again of an enlarged design, wherein its fork-shaped sections extend with their ends 159'A to such an extent that these overlap with the ends 159B of the segments 40'j and 40'k so that the cutout 158'A in the segment 40'l bridges the ends 159A and 159B between the cutouts 158A and 158B in the segment 40'j.

Furthermore, cutouts 158C are provided which are arranged so as to overlap with the ends 159C of the sections 158B located opposite the ends 159B.

The segments 40'm and 40'n are designed in a similar way.

Figure 15:
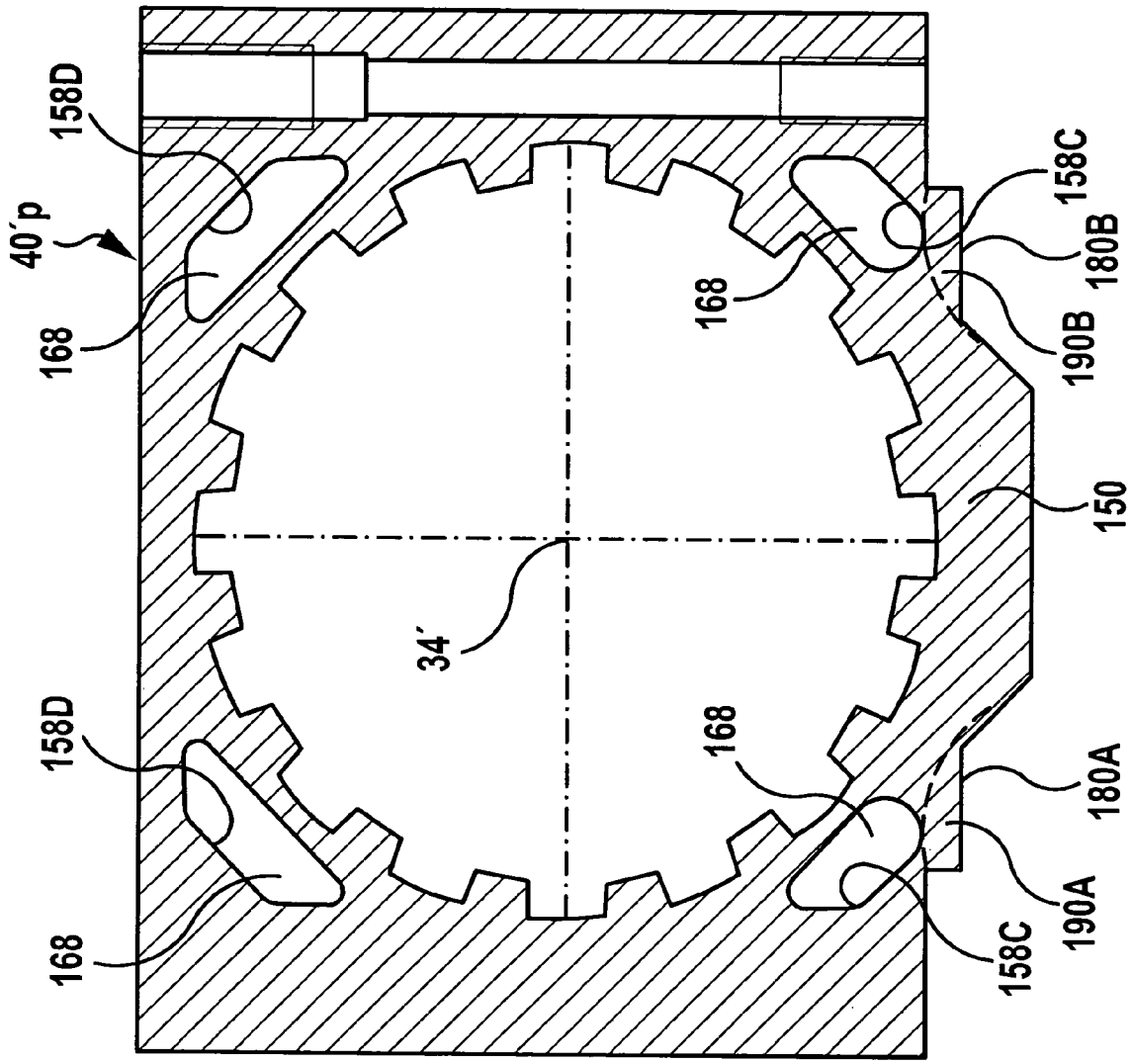
FIG. 15 shows a section along line 15—15 in FIG. 10.
Figure 16:
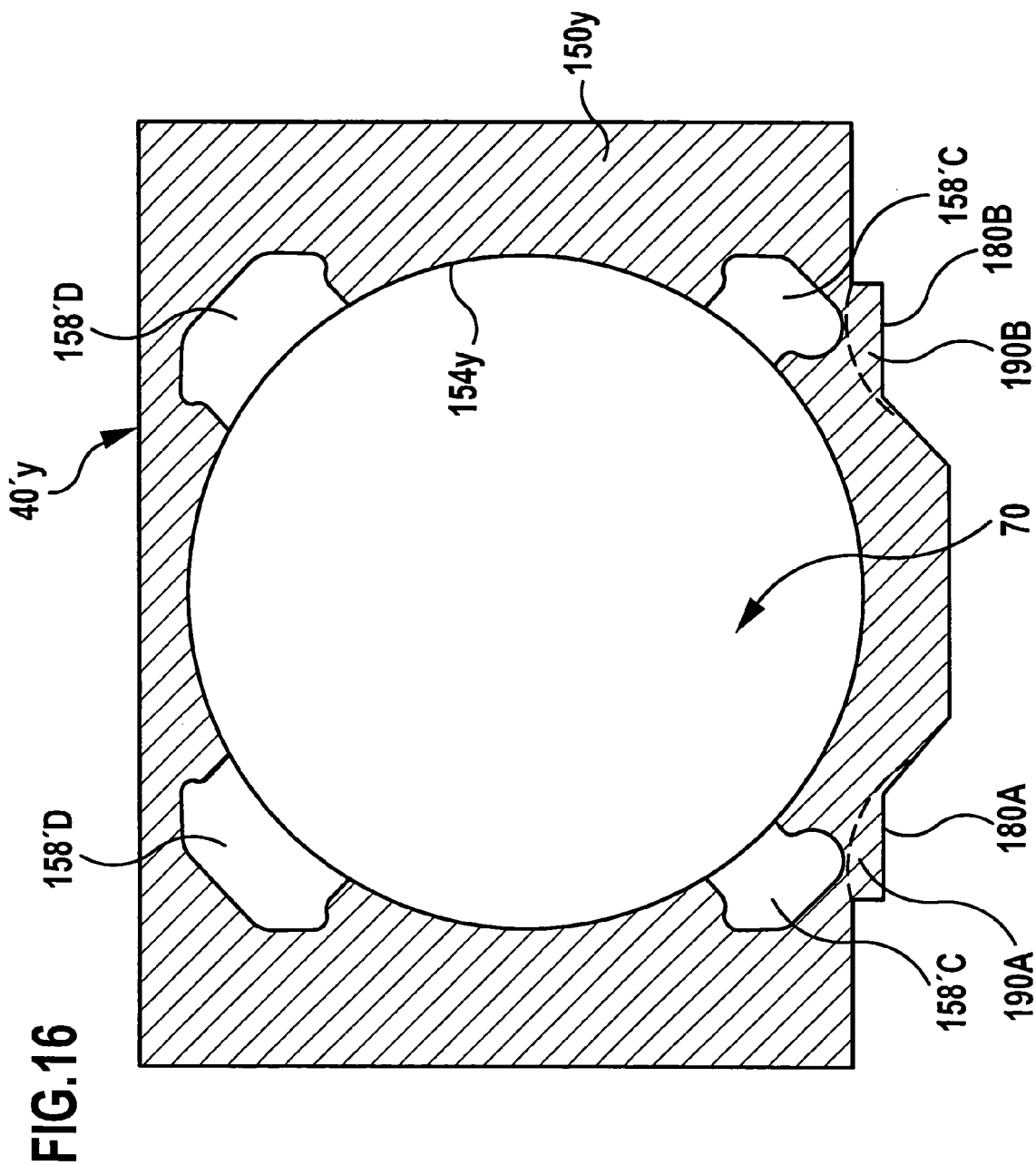
FIG. 16 shows a section along line 16—16 in FIG. 10.

As illustrated in FIG. 15 with the example of segment 40'p, supply channels 168 extend in the stacking direction 42, proceeding from the ends 159'A of the cutout 158'A of the segments 40'l to 40'n through cutouts 158D which are formed in the following segments and arranged so as to be respectively overlapping as well as through the cutouts 158C which are arranged so as to be overlapping and are likewise present in the segment 40'p, these supply channels extending along the drive housing 10', namely as far as a segment 40'y, illustrated in FIG. 16, at which the cutouts 158'D and 158'C open into a recess 70 which is enclosed by the cutout 154y and likewise extends in the stacking direction 42 essentially through the entire drive housing 10'.

Cooling air supplied via the cooling air inlet 157 is therefore distributed via the cutouts 158A and 158'A as well as the cutouts 158B to all four channels 168 and is guided along the drive housing 10' in stacking direction 42 as far as the segment 40'y and then transferred to the recess 70 via the cutouts 158'D and 158'C.

As illustrated in FIG. 9, an electromotor is arranged in the recess 70 as machine tool drive 12' which, for its part, has the cooling air which flows from the segment 40'y in the direction of the segment 40'o flowing through it.

Furthermore, a stator 173 is held by a segment package with segments which correspond to the segment 40'p and at which the cutout 154p is formed in a toothed manner around the motor axis 34' extending in stacking direction 42 and has projections 155, between which recesses 153 are located. In this respect, projections 155 support the stator 173 whereas the cooling air can flow in the recesses 153 in stacking direction 42 along the stator 173 in the direction towards the segment 40'o, at which the cutout 154b is shaped such that an exit opening 176 results, via which the cooling air can then exit.

The cooling air can, in addition, flow in a cooling manner around the bearing seat 26' for the bearing 24' of the machine tool drive 10' via the cutouts 156A and 156B which overlap with one another and form the channels 178A and 178B, respectively, and exit from the drive housing 10' on a side located opposite the cooling air inlet 157 in stacking direction 42.

As illustrated in FIGS. 11 to 16, the drive housing 10' built up from the segments 40' directly forms two guide surfaces 180A and 180B which extend at a distance from one another and extend essentially over the entire length of the drive housing 10' in stacking direction 42.

These guide surfaces 180a and 180b serve the purpose of guiding slides 140 movable by the machine tool drive 12' exactly, wherein the guiding effect of the guide surfaces 180a and 180b, as illustrated by way of example in FIG. 11, is supplemented by guide surfaces 182A and 182B located opposite and facing them as well as lateral guide surfaces 184A and 184B which are integrally formed on guide rails 186A and 186B, wherein these guide rails 186A and 186B are connected to the drive housing 10'.

The guide surfaces 180A and 180B are sliding surfaces for sliding surfaces 188A and 188B of the slide 140 which face them and must, therefore, of necessity be ground and hardened surfaces.

For this reason, the material web systems 150 of all the segments 40' are formed from a hardenable material, preferably a hardenable steel which may expediently be hardened from the segments 40' following production of the drive housing 10'.

In this respect, a hardening of all the material web systems 150 of the respective segments 40' preferably does not take place but rather a hardening in an area 190A, 190B extending from the guide surface 180A and 180B to be produced into the material web system 150 and, therefore, a selective hardening of the material web system 150 in certain sections.

A preferred hardening process is, in this respect, an induction hardening which, for example, allows the areas 190A and 190B bordering on the guide surfaces 180A and 180B, respectively, to be produced to be hardened in a concerted manner.

An alternative to the induction hardening would be, for example, other selective hardening processes.

Although the guide surfaces 180A, 180B extend in the stacking direction 42 over a plurality of segments 40', the hardening of the areas 190A, 190B, which likewise extend in the stacking direction 42 over the entire drive housing 10', does not result in the stacking direction in any hardening progression which varies, in particular, in the area of segments 40' bordering on one another but rather in the stacking direction 42 in a hardening progression which is within a range of variation of 20%, even better of 10%, of the maximum hardness.

In addition, it is also conceivable in the case of segments 40' consisting of a hardenable material to harden the partial segments 40'f to 40'l, which form the bearing seat 26' for the bearing 24' of the machine tool drive 12' with their cutouts 154F to 154l, likewise in an area 200 which borders on the cutout 154 and extends into the material web system 150 in order to bring about greater stability in the area of the bearing seat 26'.

As illustrated, in addition, in FIG. 11, the supply of lubricant via the cutouts 162 can be used to lubricate the guide means of the slide 140, wherein a lubrication in the area of the guide surfaces 180 is brought about, on the one hand, and, on the other hand, a lubrication in the guide surfaces 182 and 184 made available by the guide rails 186.

What is claimed is:

1. Drive housing for machine tool drives, comprising:
a plurality of segments stacked in a stacking direction, cut out from flat material and extending in stacking planes transversely to the stacking direction,
each of said segments having continuous material web systems extending in such a manner that segments following one another in the stacking direction abut on one another with their material web systems, thereby forming overlapping surfaces, connected to one another areally and with a material fit in the area of their overlapping surfaces;
receiving cutouts being provided in at least some of the segments, said cutouts forming a recess for accommodating a machine tool element, said recess extending over the segments in the stacking direction within the drive housing.

2. Drive housing as defined in claim 1, wherein the segments are connected to one another with a material fit by means of an areal solder layer.

3. Drive housing as defined in claim 1, wherein at least in some of the segments, the material web systems have cutouts passing through the segments over their entire thickness.

4. Drive housing as defined in claim 1, wherein the material web systems enclose the receiving cutouts at least partially.

5. Drive housing as defined in claim 1, wherein the recess formed by the receiving cutouts extends through the entire drive housing.

6. Drive housing for machine tool drives, comprising:
a plurality of segments stacked in a stacking direction, cut out from flat material and extending in stacking planes transversely to the stacking direction,
each of said segments having continuous material web systems extending in such a manner that segments following one another in the stacking direction abut on one another with their material web systems, thereby forming overlapping surfaces, connected to one another areally and with a material fit in the area of their overlapping surfaces;
some of the segments having wall webs surrounding receiving cutouts and forming a recess,
at least some of said wall webs having overlapping surfaces connected in the stacking direction to preceding and subsequent material webs with a material fit and forming a wall surrounding the recess formed by the receiving cutouts with an improved heat conduction in the area of the wall webs.

7. Drive housing as defined in claim 6, wherein the wall webs form a wall separating the recess from a cooling medium.

8. Drive housing as defined in claim 6, wherein the wall webs have in the stacking planes a width varying along the stacking planes by less than a factor of two.

9. Drive housing as defined in claim 6, wherein the wall webs extend at least over part of a circumference of respective receiving cutouts provided in at least some of the segments, said receiving cutouts forming said recess.

10. Drive housing as defined in claim 9, wherein the wall webs each have an outer contour facing away from the respective receiving cutout, the course of said outer contour essentially following that of an inner contour facing the respective receiving cutout.

11. Drive housing as defined in claim 6, wherein segments with supporting webs follow in the stacking direction on both sides of a segment with a wall web, said supporting webs being designed to be broader than the wall webs in the stacking planes.

12. Drive housing as defined in claim 11, wherein a segment with a wall web is located between two segments with a supporting web.

13. Drive housing as defined in claim 1, wherein a sum of the material web systems connected areally to one another in the overlapping surfaces forms a spatially continuous, self-supporting supporting framework for the machine tool drive.

14. Drive housing for machine tool drives, comprising:
a plurality of segments stacked in a stacking direction, cut out from flat material and extending in stacking planes transversely to the stacking direction,
each of said segments having continuous material web systems extending in such a manner that segments following one another in the stacking direction abut on one another with their material web systems, thereby forming overlapping surfaces, connected to one another areally and with a material fit in the area of their overlapping surfaces;
material webs forming the supporting framework of the drive housing, said webs being of a broader design in comparison with other material webs in the stacking planes and being arranged so as to extend in main load directions.

15. Drive housing as defined in claim 1, wherein the receiving cutout of at least one of the segments forms a bearing seat for a bearing of the machine tool drive.

16. Drive housing as defined in claim 15, wherein the bearing seat is formed by the receiving cutouts of several segments and at least some of these segments form wall webs having an improved flow of heat.

17. Drive housing as defined in claim 1, wherein at least one of the segments forms a supporting surface for the drive housing with its outer contour.

18. Drive housing as defined in claim 1, wherein at least one of the segments forms a position-determining element of the drive housing.

19. Drive housing for machine tool drives, comprising:
a plurality of segments stacked in a stacking direction, cut out from flat material and extending in stacking planes transversely to the stacking direction,
each of said segments having continuous material web systems extending in such a manner that segments following one another in the stacking direction abut on one another with their material web systems, thereby forming overlapping surfaces, connected to one another areally and with a material fit in the area of their overlapping surfaces;
at least some of the segments having cooling channel cutouts forming at least one cooling channel section of a cooling channel system extending through the drive housing.

20. Drive housing as defined in claim 19, wherein the cooling channel cutouts of segments following one another in the stacking direction form cooling channel sections extending through the drive housing with deviations.

21. Drive housing as defined in claim 19, wherein the at least one cooling channel sections extends through the drive housing with multiple deviations.

22. Drive housing as defined in claim 19, wherein the at least one cooling channel section extends approximately in a direction transverse to an axis of the stack.

23. Drive housing as defined in claim 22, wherein the at least one cooling channel section has meanders extending in a direction of the stacking direction and alternates between the cooling channel cutouts of at least two segments.

24. Drive housing as defined in claim 22, wherein the at least one cooling channel section extends transversely to the stacking direction in certain sections in one segment and is closed in the stacking direction by the material web systems of the preceding and the next following segment.

25. Drive housing as defined in claim 22, wherein the at least one cooling channel section changes during the course of its extension transversely to the axis of the stack at least from one segment into the next following segment and then back into the one segment.

26. Drive housing as defined in claim 19, wherein some of the segments have cooling channel cutouts supplementing one another to form the at least one cooling channel section extending in the stacking direction.

27. Drive housing as defined in claim 26, wherein the cooling channel cutouts supplement one another in the segments to form the at least one cooling channel section extending in the stacking direction but having at least one meander transverse to the stacking direction.

28. Drive housing as defined in claim 27, wherein the cooling channel section has a shape bent in the stacking planes.

29. Drive housing as defined in claim 27, wherein the cooling channel section has meanders extending transversely to the stacking direction.

30. Drive housing as defined in claim 1, wherein at least in some of the segments, the material web systems are produced from a hardenable material.

31. Drive housing as defined in claim 30, wherein the material web systems are produced from a material hardenable following production of the drive housing.

32. Drive housing as defined in claim 31, wherein the material is capable of being hardened by way of induction hardening.

33. Drive housing for machine tool drives, comprising:
- a plurality of segments stacked in a stacking direction, cut out from flat material and extending in stacking planes transversely to the stacking direction,
- each of said segments having continuous material web systems extending in such a manner that segments following one another in the stacking direction abut on one another with their material web systems, thereby forming overlapping surfaces, connected to one another areally and with a material fit in the area of their overlapping surfaces;
- the drive housing having a guide surface for a movable machine element, said guide surface being formed by at least one of said segments.

34. Drive housing as defined in claim 33, wherein the guide surface extends in the stacking direction over several segments.

35. Drive housing as defined in claim 33, wherein the guide surface is formed by a surface of a section of the material web system of the respective segment.

36. Drive housing as defined in claim 33, wherein the guide surface is located in an area of an outer contour of the respective segment.

37. Drive housing as defined in claim 33, wherein the guide surface is formed by a surface of a narrow side in a section of the respective material web system.

38. Drive housing as defined in claim 37, wherein the section of the material web system is hardened.

39. Drive housing as defined in claim 33, wherein the guide surface is a hardened surface.

40. Drive housing as defined in claim 39, wherein the guide surface has a hardening progression essentially constant in the stacking direction.

41. Drive housing as defined in claim 33, wherein the guide surface is a sliding guide surface.

* * * * *